(12) United States Patent
Khoo et al.

(10) Patent No.: US 8,730,855 B2
(45) Date of Patent: May 20, 2014

(54) METHOD AND DEVICE FOR DETECTING A CHANNEL

(75) Inventors: Hun Weng Khoo, Penang (MY); Yueh Ching Chung, Pul (MY); David G. Wiatrowski, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 400 days.

(21) Appl. No.: 12/976,081

(22) Filed: Dec. 22, 2010

(65) Prior Publication Data

US 2012/0163377 A1 Jun. 28, 2012

(51) Int. Cl.
*H04B 7/00* (2006.01)
*H04W 56/00* (2009.01)

(52) U.S. Cl.
CPC ................................. *H04W 56/0085* (2013.01)
USPC ............ 370/310; 370/321; 370/324; 370/336; 370/337; 370/343; 370/344; 370/345; 370/350; 370/464; 370/479; 370/480; 370/498; 370/503; 370/509; 370/510; 370/512; 370/513; 370/514

(58) Field of Classification Search
None
See application file for complete search history.

(56) References Cited

U.S. PATENT DOCUMENTS

| 6,122,334 | A * | 9/2000 | Hughes | 375/350 |
|---|---|---|---|---|
| 7,203,207 | B2 * | 4/2007 | Hiben et al. | 370/514 |
| 7,369,869 | B2 * | 5/2008 | Wiatrowski et al. | 455/518 |
| 2004/0047323 | A1 * | 3/2004 | Park et al. | 370/338 |
| 2004/0127161 | A1 * | 7/2004 | Leizerovich et al. | 455/67.11 |
| 2007/0009055 | A1 * | 1/2007 | Koga et al. | 375/260 |
| 2008/0008153 | A1 * | 1/2008 | Hiben et al. | 370/344 |
| 2008/0013637 | A1 * | 1/2008 | Kodama et al. | 375/260 |
| 2008/0081675 | A1 * | 4/2008 | Pinder | 455/574 |
| 2010/0086092 | A1 * | 4/2010 | Wiatrowski et al. | 375/362 |
| 2010/0099404 | A1 * | 4/2010 | Khoo et al. | 455/433 |
| 2010/0105381 | A1 * | 4/2010 | Takeda | 455/434 |
| 2010/0262690 | A1 * | 10/2010 | Jokinen | 709/224 |

FOREIGN PATENT DOCUMENTS

| EP | 1545148 A2 | 6/2005 |
|---|---|---|
| EP | 1564943 A1 | 8/2005 |
| EP | 2217019 A1 | 8/2010 |

OTHER PUBLICATIONS

PCT International Search Report Dated May 4, 2012 for Counterpart Application PCT/US2011/065823.
J. Eldon, "Applications of the Digital Correlator", Microprocessors and Microsystems, IPC Bsiness Press Ltd, London, GB; vol. 12, No. 4, May 1, 1988; pp. 214-223; XP000098953, ISSN:0141-9331, D01: 10.1016/0141-93331(88)90166-4.

* cited by examiner

*Primary Examiner* — Ayaz Sheikh
*Assistant Examiner* — Peter Chau
(74) *Attorney, Agent, or Firm* — Daniel R. Bestor

(57) ABSTRACT

A method for detecting a channel in a mixed-mode communications system is presented. The channel contains a primary synchronization pattern in a predetermined location within the channel. The primary synchronization pattern is compared against different predetermined channel synchronization patterns to detect a channel. Upon detection of the channel, a look-back channel detector confirms the existence of the channel by using the location of the primary synchronization pattern. Detection and confirmation of the channel may be employed simultaneously to each channel of a multiple-channel direct mode of operation signal. Audio holes may be eliminated in a 2:1 TDMA direct mode operation where both time slots contain signals from two different originating communication devices and the signals have different priority.

18 Claims, 6 Drawing Sheets

METHOD AND DEVICE FOR DETECTING A CHANNEL

FIELD OF THE INVENTION

The present invention relates generally to channel and carrier detection in a communications system. In particular, the invention relates to channel and carrier detection in a mixed mode communications system.

BACKGROUND

Some wireless communications devices, known as back-to-back communications devices, are able to communicate directly with each other without the use of a communications network. Often times, this direct communication is used for short-range 'push-to-talk' (PTT) type voice and/or data communications.

Back-to-back communications devices have an option to operate in a direct mode of operation (DMO), where the communications devices communicate directly with each other without using a communications network. This would be contrary to a repeater mode, where the communications devices communicate through a communications network. In repeater mode, a communications device transmits on a receive frequency of a repeater and receives on a transmit frequency of a repeater, while in DMO, a single frequency is used by a back-to-back communications device for both transmitting and receiving. Because of the use of a single frequency for transmitting and receiving, problems (e.g. false carrier detection, false channel detection, and transmission gaps) that occur in both modes are magnified in DMO. Furthermore, problems are magnified when the communications devices are part of a mixed-mode communications system. With an increased variation of modes of operation, the communications devices have a greater difficulty in detecting carriers and channels received.

To illustrate the problems, such as false channel detection and false carrier detection, carrier detection and channel detection need to be understood.

Channel detection is concerned with the detection of attributes that define a channel. In a time division multiple access (TDMA) system, a channel (time slot) is detected when the beginning and the end of the time slot is detected.

Carrier detection is concerned with whether another radio is keyed or dekeyed on a channel, where "key" and "dekey" indicate whether a radio is transmitting ("keyed") or not transmitting ("dekeyed"). In one conventional method of carrier detection, a device measures received power within a channel and indicates whether the received power exceeds a predetermined threshold. The conventional method of carrier detection is typically designed to detect quickly the presence of energy in a channel, so that the beginning of transmissions will not be missed. The carrier detection is also designed to slowly detect the loss of energy in the channel, so that the receiver is able to tolerate momentary or intermittent fading in the received signal due to continual fluctuations in the strength of a received radio signal. These design characteristics typically cause false carrier detection. However, the carrier detection design characteristics are suitable for a continuous transmission. A continuous transmission may be a FDMA analog, FDMA digital, or a TDMA digital transmission emanating from a repeater as a continuous transmission, as defined in ETSI-DMR, where the repeater transmits a single continuous transmission supporting all channels. This carrier detection strategy is unfortunately not suitable for a series of transmissions that are not continuous. For example, the strategy is not suitable for detecting the presence of a transmission within a time slot of a pulsing TDMA digital transmission.

With reference to FIG. 6, depicted are three cases of TDMA transmissions between which a conventional carrier detector will not be able to distinguish because of its fast-attack and slow-release design characteristics. In Case (a), a transmission sourced by a first communications device is present in channel 1. In Case (b), a transmission sourced by a second communications device is present in channel 2. In Case (c), a transmission is present in both channels (two-channel DMO), where a first communications device is transmitting in channel 1 and a second communications device is transmitting in channel 2. In Case (a) and (b), false detection occurs when using the carrier detector because once energy is detected within a channel, the slow-release characteristic of the carrier detector will not allow the carrier detector to evaluate a second channel independent of a first channel. For example, assume the carrier detector detects a carrier in time slot 1. With a slow-release carrier detector, the carrier detector will indicate that the carrier is present all the way through time slot 2; thus, the carrier detector erroneously indicates a carrier transmission in channels 1 and 2. As is clear from Case (c), the aforementioned scenario is a greater problem in two-channel DMO, because false detection not only indicates the false presence of a carrier in a channel (false carrier detection) it also falsely indicates in which channel the carrier occurs (false channel detection).

A solution for resolving the above-mentioned problems of false carrier detection is to use a different signal qualification technique, such as detection of a synchronization pattern embedded within a signal in addition to the classical carrier detection technique. Furthermore, detection of a synchronization pattern may serve to corroborate an initial conventional carrier detection process. A carrier detector that detects a carrier by additionally detecting a synchronization pattern is hereinafter referred to as a carrier synchronization pattern detector.

It is also desirable to use a synchronization pattern for detection of a channel. A device that enables this method for channel detection is hereinafter referred to as a channel synchronization pattern detector.

Though a carrier synchronization pattern detector is an improvement over the conventional carrier detector, there are still problems with false detection when using synchronization detection, especially in a multiple-channel DMO system. Use of detection of a synchronization pattern to corroborate an initial conventional carrier detection process may decrease false carrier detection for some modes of operation. The technique of combining conventional carrier detection and synchronization detection has been successfully applied to single channel modes and repeater modes. However, when applying such a technique to a multiple-channel DMO, false carrier detection occurs at an unacceptable rate. Similarly, when trying to apply this technique to channel detection, false channel detection occurs at an unacceptable rate. This technique causes false channel detection, because the channel synchronization pattern detector may not be in synchronization with the channel due to a false detection of the channel synchronization pattern. Synchronization detection typically allows for the detection of a synchronization pattern of a channel; however, the synchronization pattern may be detected falsely. Therefore, the boundaries of the channel are determined falsely. Consequently, in a multiple-channel DMO system it is likely that channel detection occurs while spanning multiple channels, resulting in skewed and often unpredictable results as to which channel or channels the transmission is present.

As a result, it would be desirable within a mixed-mode communications system that has back-to-back communications devices that operate in a multiple-channel DMO, to incorporate a carrier and channel detection scheme that provides reliable carrier and channel detection.

SUMMARY

In various aspects, methods are presented for reliably detecting a channel of a mixed-mode communications system. The channel has a primary synchronization pattern at a location within the channel, such as a temporal location in a case of a TDMA signal. Channel existence is detected by determining that a match exists between the primary synchronization pattern and one of a plurality of predetermined channel synchronization patterns. Upon detection of the channel (finding the match), a look-back channel detector confirms the presence of the channel by determining that a first signal strength of the channel, from a first data edge of the channel to a second data edge of the channel, exceeds a first predetermined signal strength. This provides more reliable channel detection. The process of detecting and confirming one channel may be applied simultaneously, in synchronization, to each channel of a multiple-channel DMO signal. Employing this simultaneous process eliminates gaps in a reception of the multiple-channel DMO signal when performing a priority sampling on a channel while receiving a signal on another channel.

Carrier existence can be determined in a similar manner. More specifically, methods are presented for confirming the presence of a carrier in order to improve carrier detection reliability. For example, the use of a look-back carrier detector confirms the presence of a carrier. The look-back carrier detector confirms the presence of a carrier by comparing strength of the signal against a predetermined signal strength. The look-back carrier is aware of boundaries of the signal from a predetermined location of a synchronization pattern of the signal. For example, in a TDMA signal, a synchronization pattern often occurs in the center of the signal and the signal has a predetermined duration, so time slot boundaries are readily calculated when the temporal location of the synchronization pattern is known. The method to confirm the presence of a carrier may also be employed to confirm a presence of a channel as well.

In other aspects, devices for channel and/or carrier detection using a synchronization pattern detector and look-back detector are provided.

The scope of the present invention is defined solely by the appended claims and is not affected by the statements within this summary.

BRIEF DESCRIPTION OF THE DRAWINGS

The invention defined by the claims can be better understood with reference to the embodiments of the following drawings and description. The components in the figures are not necessarily to scale, emphasis instead being placed upon illustrating the principles of the invention.

DETAILED DESCRIPTION

The present invention makes use of a primary synchronization pattern of a signal of a transmission in a communications system to detect reliably a channel and/or a carrier by comparing the primary synchronization pattern against a plurality of predetermined channel and/or carrier synchronization patterns for detecting a channel and a carrier. To confirm the detection of the channel and increase reliability, a first signal strength of the channel, from a first data edge of the channel to a second data edge of the channel, is compared against a first predetermined signal strength for confirming the channel. To confirm the detection of the carrier, and increase reliability, a second signal strength of the signal, from a first boundary to a second boundary of the signal, is compared against a second predetermined signal strength for confirming the carrier of the signal.

For convenience, when referring to channel detection or detection of a channel, in actuality a reference is being made to detection of the physical parameters that describe a channel. For example, when referring to a channel in the context of a TDMA system where the transmission medium is a time slot, the reference is being made to the physical parameters that describe a time slot, such as the temporal boundaries or data edge of a time slot.

In the description that follows, the subject matter of the application will be described with reference to acts and symbolic representations of operations that are performed by one or more communications device unless indicated otherwise. However, although the subject matter of the application is being described in the foregoing context, it is not meant to be limiting as those skilled in the art will appreciate that some of the acts and operations described hereinafter can also be implemented in hardware, software, firmware, or some combination thereof. As such, it will be understood that such acts and operations, which are at times referred to as being communications device-executed, include the manipulation by the processing unit of the communications device of electrical signals representing data in a structured form. This manipulation transforms the data and/or maintains it at locations in the memory system of the communications device that reconfigures or otherwise alters the operation of the communications device in a manner well understood by those skilled in the art. The data structures where data is maintained are physical locations of the memory that have particular properties defined by the format of the data. However, although the subject matter of the application is being described in the foregoing context, it is not meant to be limiting as those skilled in the art will appreciate that some of the acts and operations described hereinafter can also be implemented in hardware, software, firmware or some combination thereof.

Figure 1:
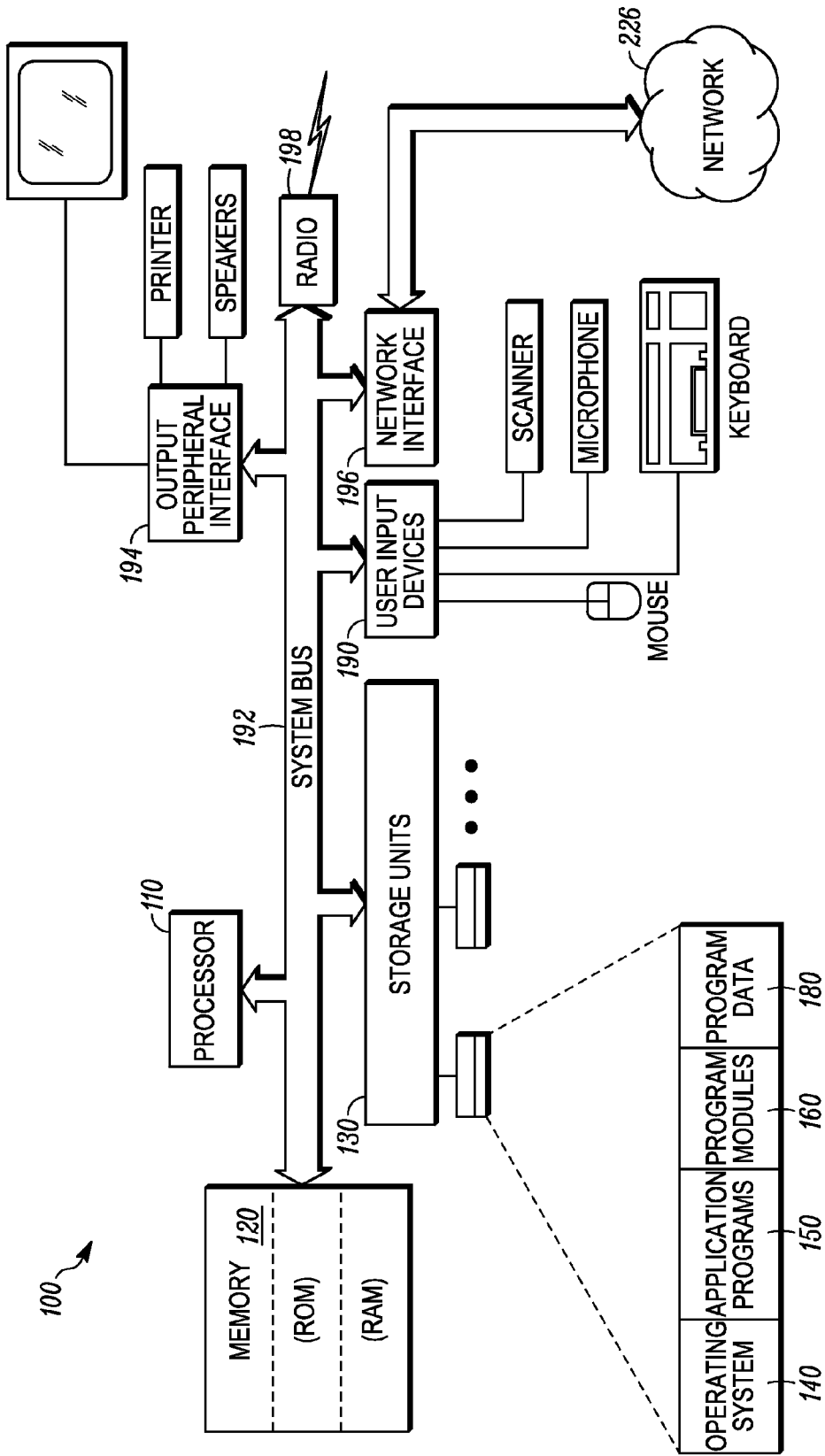
FIG. 1 depicts a block schematic diagram of an exemplary communications device, in accordance with one embodiment of the present invention.

With reference to FIG. 1, depicted is an exemplary communications device 100, which could be any device that can be used to receive, store, process, and transmit information, including devices such as a wireless communications device, a back-to-back communications device, a networked communication device, and a gateway. Communications device 100 may be a portable device, wherein at least some or all of its components are formed together in a single device that can be carried around by a person. The communications device 100 includes a processor 110, memory 120, and one or more storage units 130. The storage units 130 and their associated communications device readable memory medium provide storage of communications device readable instructions, data structures, program modules and other data for the communications device 100. Storage units 130 can store the contents of an operating system 140, application programs 150, program modules 160, and program data 180. Communications device 100 further includes input devices 190 through which data may enter the communications device 100, either automatically or by a user who enters commands and data. Input devices 190 can include an electronic digitizer, an electronic scanner, a barcode reader, a microphone, a camera, a video camera, a keyboard and a pointing device, a trackball, a touch pad, any USB enabled device, any Bluetooth enabled device, an RFID and/or NFC device, and a debit card reader. Other input devices may include a joystick, game pad, an antenna, and the like.

These and other input devices 190 can be connected to processor 110 through a user input interface that is coupled to a system bus 192, but may be connected by other interface and bus structures, such as a parallel port, game port and/or a universal serial bus (USB). Communications device 100 may also include other peripheral output devices such as speakers, a printer, and a display device, which may be connected through an output peripheral interface 194 and the like.

Communications device 100 also includes a radio 198 and/or other type of communications device for wirelessly transmitting and receiving data for the communications device 100 with the aid of an antenna. Radio 198 may wirelessly transmit and receive data using ETSI TS 102 361- (ETSI-DMR), ETSI TS 102 490 (ETSI-dPMR), TIA-102 (APCO Project 25), WiMAX™, 802.11a/b/g/n, Bluetooth™, 2G, 2.5G, 3G, and 4G. Communications device 100 may operate in a networked environment using logical connections to one or more remote communications devices 100.

Figure 2:
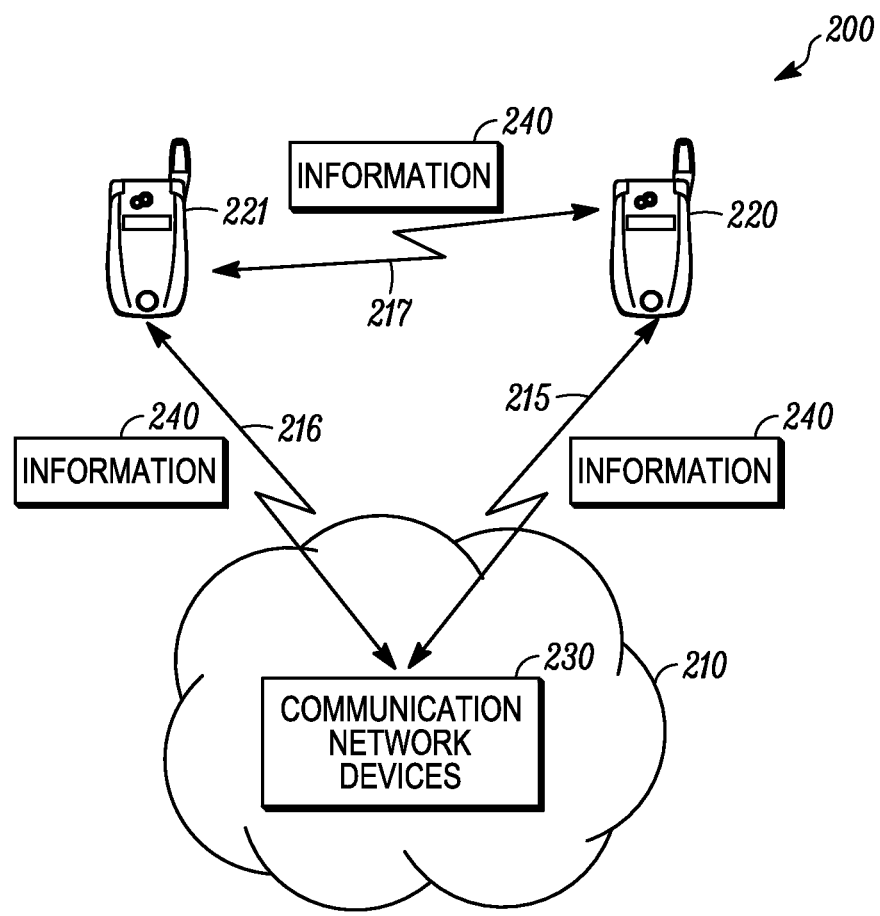
FIG. 2 depicts an illustration of an exemplary mixed-mode communications system having back-to-back communications devices and network communications devices, which are able to communicate with each other in a repeater mode and a direct mode, in accordance with one embodiment of the present invention.

With reference to FIG. 2, depicted is a mixed-mode communications system 200 having back-to-back communications devices 220 and 221 and communications network devices 230. The back-to-back communications devices 220 and 221 communicate directly 217 in a DMO or indirectly 215 and 216 through a land mobile two-way infrastructure 210, in a repeater mode. In a preferred land mobile two-way infrastructure 210, all the communications devices within the communications system 200, such as the back-to-back communications devices 221 and 220 and the communications network devices 230, communicate with each other using a common air interface protocol, such as a ETSI TS 102 361- (ETSI-DMR) protocol defined by ETSI. Preferably, the communications system 200 is used to connect a variety of wireless communications devices, including back-to-back communications devices 221 and 220 and networked communications devices 230, to each other allowing for the exchange of information 240 between the wireless communications devices.

A wireless communications device is any device that can transmit and receive information wirelessly, and includes any device having a radio, a radio receiver, and radio transmitter, and/or a radio transceiver. Back-to-back communications devices 221 and 220 include PTT devices, walkie-talkies, and other short range and long range wireless communications devices that do not require using the land mobile two-way infrastructure 210. Networked communications devices 230 include cellular phones, smart phones, pagers, and other wireless communications devices that transmit information 240 to each other using the land mobile two-way infrastructure 210.

Land mobile two-way infrastructure 210 is a network node equipped for interfacing various modes and protocols, such as repeater mode and the above-mentioned common air interface protocol. Preferably, the infrastructure 210 includes devices such as protocol translators, impedance matching devices, rate converters, fault isolators, and/or signal translators as necessary to provide interoperability between varying modes and protocols. The infrastructure 210 interfaces both the networked communications devices 230 and the back-to-back communications devices 221 and 220. When employing DMO, the back-to-back communications devices 221 and 220 communicate directly 218, bypassing the infrastructure 210.

Information 240 includes any type of data that can be sent within a communications system 200, such as text messages, voice and/or audio messages, pictures, video, text, and any other data that can be transmitted. Information 240 is transmitted in a signal of a transmission, where the signal has a carrier type, also known as the carrier of a signal. Information 240 includes header information, payload information, and synchronization information. Transmission includes the signal, noise, and boundaries between the noise and the signal.

Figure 3:
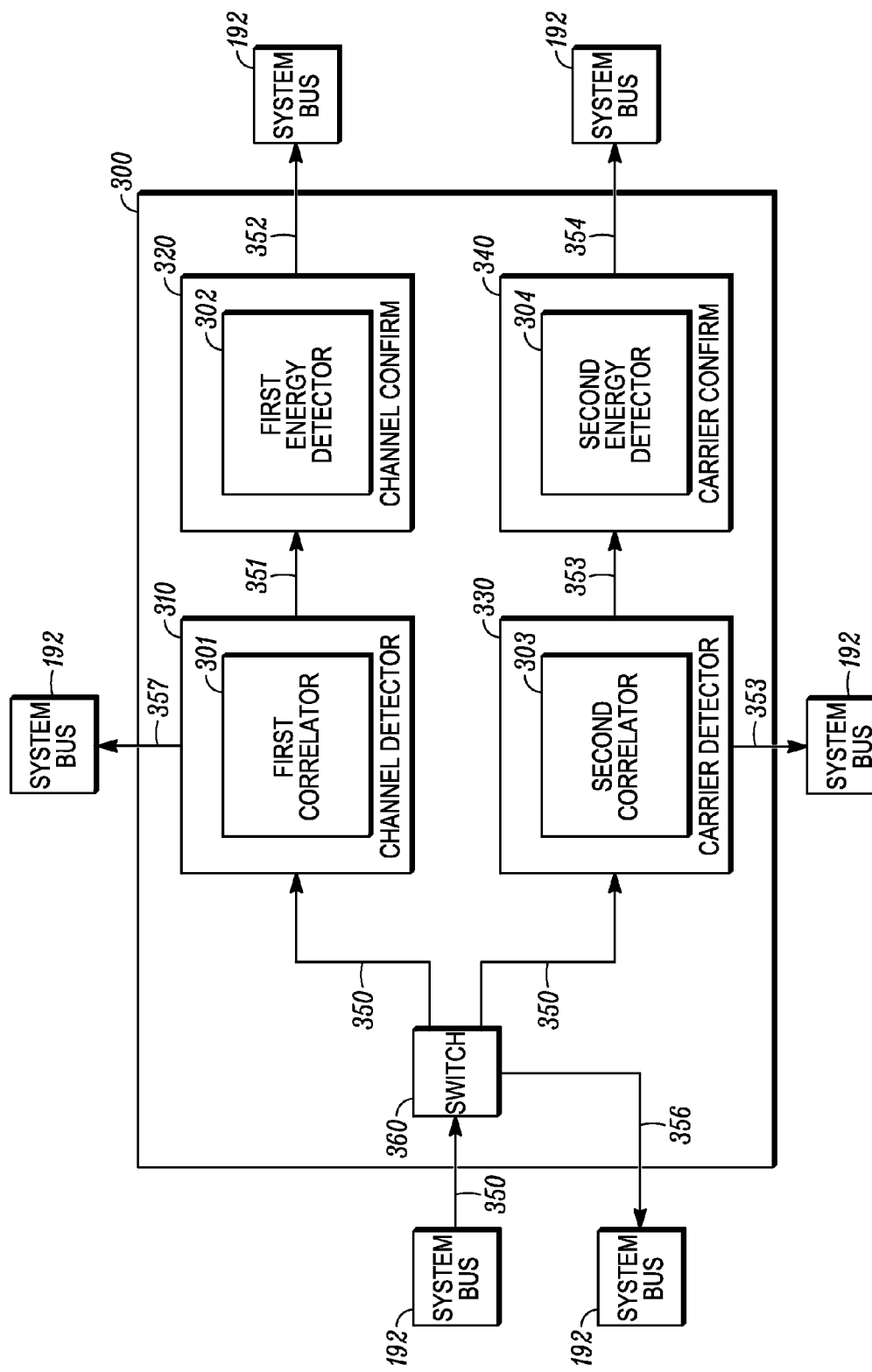
FIG. 3 depicts a flowchart illustration of a device, components of the device, and coupling between the device and the exemplary communications device of FIG. 1, in accordance with one embodiment of the present invention.

With reference to FIG. 3, depicted is a detection module 300 for detecting a channel and a carrier in a communications system. In one embodiment, the detection module 300 is only used to detect channel presence/existence. In another embodiment, the detection module 300 includes a carrier detector for detecting the presence of a carrier, a synchronization pattern detector to confirm the carrier detection and locate a synchronization pattern of a channel, and a look-back channel detector that confirms the presence/existence of the channel.

The detection module 300 resides within communications device 100. The carrier has a primary synchronization pattern having a location within the channel. The detection module 300 contains a channel synchronization pattern detector 310 having a first correlator 301 to compare the primary synchronization pattern against a plurality of predetermined channel synchronization patterns for detecting a channel. A look-back channel detector 320 in the detection module 300 has a first energy detector 302 to compare a first signal strength of the channel, from a first data edge of the channel to a second data edge of the channel, against a first predetermined signal strength for confirming the channel. A carrier synchronization pattern detector 330 in the detection module 300 has a second correlator 303 to compare the primary synchronization pattern against a plurality of predetermined synchronization patterns for detecting a carrier of a signal. A look-back carrier detector 340 in the detection module 300 has a second energy detector 304 to compare a second signal strength of the signal, from a first boundary to a second boundary of the signal, against a second predetermined signal strength for confirming the carrier of the signal. The system bus 192 couples the components of the communications device 100 with the components of the detection module 300, which includes coupling the communications device 100 with the channel synchronization pattern detector 310, the look-back channel detector 320, the carrier synchronization pattern detector 330, the look-back carrier detector 340, and an operation mode switch 360. The operation mode switch 360 may be any known component for switching the mode of operation, including manual or automatic switches.

A carrier detector, as described previously, is any device that is used for detecting a carrier. Likewise, a channel detector is any device that is used for detecting a channel. A carrier synchronization pattern detector is a carrier detector that enables carrier detection through synchronization pattern detection. Likewise, a channel synchronization pattern detector is a channel detector that enables channel detection through synchronization pattern detection. In general, a look-back carrier detector is a carrier detector that enables carrier detection confirmation by looking back at a detected signal and confirming that the detected signal is a valid signal by having an energy detector compare a signal strength of the carrier, from a first boundary of the carrier to a second boundary of the carrier, against a first predetermined signal strength for confirming the carrier. Likewise, a look-back channel detector is a channel detector having an energy detector to compare a first signal strength of the channel, from a first data edge of the channel to a second data edge of the channel, against a first predetermined signal strength for confirming the channel.

In one embodiment where the mode switch 360 is an automatic switch, the automatic switch may be a dynamic mixed mode system. The dynamic mixed mode system uses a pre-qualification method, such as using a carrier detector, to determine whether a signal is analog or digital and then seamlessly enables an appropriate stack (audio stack or digital stack) for data processing whereby audio truncation is minimized. The dynamic mixed mode system has an analog stack that has a digital sub-stack that is capable of performing a synchronization search. In one embodiment, use of a look-back carrier detector improves the synchronization search reliability. Upon powering up the dynamic mixed mode system, the analog stack is used by default. When digital synchronization is found, the digital stack immediately replaces the analog stack, henceforth the seamless enablement of the appropriate stack. When digital synchronization is lost, the digital stack is replaced by the analog stack having the digital sub-stack.

The various elements within the detection module 300 are formed by hardware components, software components, firmware components, or some combination thereof. In a preferred embodiment, the aforementioned components are components of a digital signal processor (DSP).

The input 350 into the detection module 300 is a transmission having a desired signal. The input 350 into the detection module 300 may also be the input into the channel synchronization pattern detector 310, the look-back channel detector 320, the carrier synchronization pattern detector 330, the look-back carrier detector 340, and the operation mode switch 360.

The output from the detection module 300 includes the output 351 of the channel synchronization pattern detector 310, the output 352 of the look-back channel detector 320, the output 353 of the carrier synchronization pattern detector 330, the output 354 of the look-back carrier detector 340, and the output of 356 the operation mode switch 360. The output 351 of the channel synchronization pattern detector 310 indicates whether a channel was detected and, if so, which channel was detected. The output 352 of the look-back channel detector 320 confirms that the synchronization pattern detector 310 validly detected the channel. The output 353 of the carrier synchronization pattern detector 330 indicates whether a carrier was detected and, if so, which type of carrier was detected. The output 354 of the look-back carrier detector 340 confirms that the carrier synchronization pattern detector 330 validly detected the carrier. The output of the operation mode switch 356 indicates signal mode, for example, when the carrier is an analog signal, then the detection module 300 signals the other circuitry in communications device 100 to operate in a manner designed for processing an analog signal. In one embodiment, a physical representation of the outputs 351-356 of the detection module 300 may be provided by an LED, and/or text and/or a symbol on a display of the communications device 100.

In general, the carrier modulation of a signal may be either digital or analog. For example, a digital signal may be a single-channel signal, such as FDMA or an N:1 (N timeslots supported in a single RF channel) TDMA signal where only one time slot may be used. The ETSI-DMR standard presently defines a 2:1 TDMA signal for direct/talk around operation where only one time slot may be used. Alternatively, a digital signal may be a multiple-channel signal, such as an N:1 TDMA signal where all time slots may be used. Furthermore, a multiple-channel signal may be a signal where the channels are prioritized. Additionally, a digital signal may be distinguished by its source and/or means by which it is transmitted. For example, a digital signal may have a DMO format or a repeater mode format.

In one embodiment, the detection module 300 has indicators for indicating a mode of operation and the status of one or more channels, such as a channel of interest. In the case where only detection of one channel of interest is indicated, if the communications device 100 is provisioned to detect presence of a signal on the desired channel, the indicators only provide indication for the particular channel and no information is provided regarding a signal on another channel.

Figure 4:
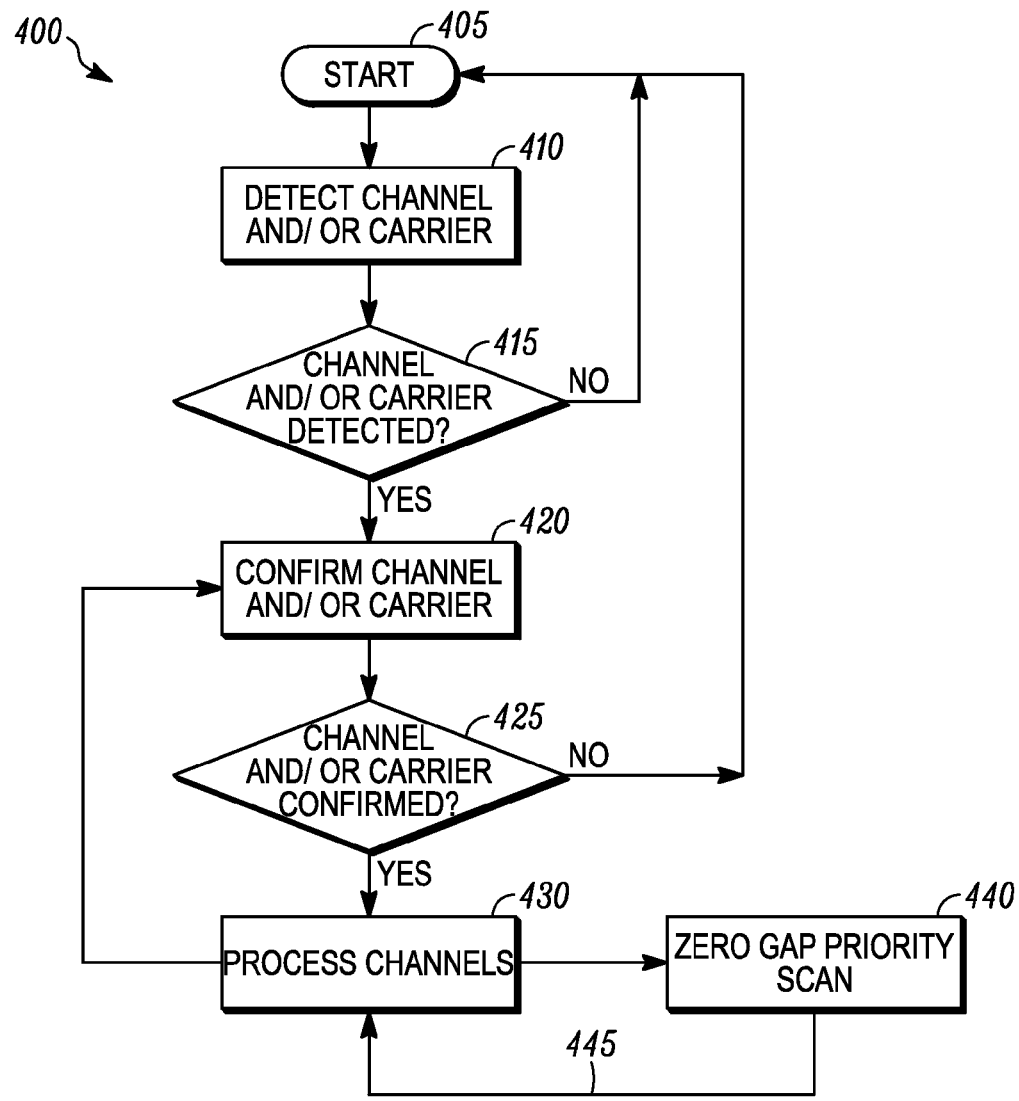
FIG. 4 depicts a flowchart illustration of a method for detecting a channel and/or a carrier in a mixed mode communications system, in accordance with one embodiment of the present invention.

FIG. 4 illustrates one embodiment of a method for detecting a channel and/or a carrier of a transmission in a mixed mode communications system. The method 400, which makes use of a primary synchronization pattern of a signal, is initiated at block 405. The primary synchronization pattern is a mechanism used to coordinate symbol timing, channel timeslot alignment, and framing between a transmitter and a receiver. For example, a synchronization pattern in a TDMA system acts as a clock to coordinate multiple simultaneous transmissions and avoid the transmissions from colliding with or transmitting on top of one another.

After initialization, at block 410 a correlator compares the primary synchronization pattern against a plurality of predetermined channel synchronization patterns for detecting a channel and/or a carrier. A correlator is a circuit component, formed from hardware, software, firmware, or some combination thereof, that compares input data to predetermined data. In a preferred embodiment, the correlator detects the channel and/or the carrier when the primary synchronization pattern matches one of the predetermined synchronization patterns for detecting a channel and/or a carrier of a signal respectively. In another preferred embodiment, the carrier detector utilizes an energy detector as opposed to a correlator to detect the presence of the carrier.

Using the comparison of block 410, at block 415, if the channel and/or the carrier is not detected then the process returns to block 405, where the communications device waits for a predetermined amount of time or until receiving some input before attempting to detect a channel and/or a carrier. If the channel and/or the carrier is detected at block 415, then the process continues to block 420, where a correlator attempts to confirm the detection of the channel and/or carrier. To confirm the detection of the channel, a first signal strength of the channel, from a first data edge of the channel to a second data edge of the channel, is compared against a first predetermined signal strength for confirming the presence of the channel. To confirm the detection of the carrier, a second signal strength of the signal, from a first boundary to a second boundary of the signal, is compared against a second predetermined signal strength for confirming presence of the carrier. In a preferred embodiment, the first data edge and the second data edge of the channel and the first boundary and the second boundary of the signal may be determined from a location of the primary synchronization pattern. In a preferred embodiment, the presence of the channel is confirmed when the first signal strength, from the first data edge to the second data edge, is greater or equal to the first predetermined signal strength. In such an embodiment, the first data edge may be defined by a first symbol of a burst within a channel and the second data edge is defined by a last symbol of the burst within the channel. The presence of the carrier is similarly confirmed when the second signal strength, from the first boundary to the second boundary, is greater or equal to the second predetermined signal strength.

At block 425, if at least one of the channels and/or the carrier is not confirmed then the process returns to block 405, where the communications device waits for a predetermined amount of time or until receiving some input before attempting to detect a channel and/or a carrier. However, if confirmation occurs at block 425 then the process continues to block 430, where the channel is processed. At the same time the channel is being processed, the communication device continues to confirm the channel and/or carrier. In one embodiment, the channel and/or carrier is confirmed by checking continually for a synchronization pattern associated with the channel and/or carrier, where the absence of the associated synchronization pattern is accepted once otherwise the channel and/or carrier is not confirmed. In other words, non-detection of the expected associated synchronization pattern twice in row causes the process to return to block 405, where the communications device waits for a predetermined amount of time or until receiving some input before attempting to detect a channel or a carrier.

Where there are multiple channels in the signal and the communications device is operating in multiple-channel DMO, the process continues to block 440, where the communications device performs a zero audio hole priority scan on the multiple channels. Zero audio hole priority scan allows the communications device to process the channel with the highest priority without producing gaps in a lower priority received transmission. Gaps in a transmission (audio hole in an audio transmission) occur in a multiple-channel DMO system during a conventional priority scan, because transmission on a channel is momentarily paused to check for other channels that may have a higher priority. The zero audio hole priority scan eliminates the need to pause reception and check the priority of other channel, by dedicating an individual channel detector to each channel. Upon determining a higher priority channel from the zero audio hole priority scan, the process returns 445 to block 430 to process the higher priority channel. When multiple channels with different priorities are detected and processed and there are insufficient resources to process both simultaneously, the higher priority channel is processed before a lower priority channel. In one embodiment, upon determining a priority channel from the zero audio hole priority scan, the method may return to block 405 or block 420.

In repeater mode, a gap in transmission is not a problem when determining channel priority, because a repeater typically transmits a Common Announcement Channel (CACH) signal, which provides information about the contents of the other channel without having to examine the other channel.

Specifically in an N:1 TDMA DMO audio transmission (in the ETSI-DMR standard, N=2 and in the Tetra standard, N=4) audio hole leads to distortion in the audio output to a user of the communications device, where the N slots contain signals from N different originating communication devices with different priority. To eliminate audio holes, N:1 TDMA DMO channels from different originating communication devices are processed simultaneously. When channels are processed simultaneously, there is no gap in the received audio due to periodic sampling of the higher priority channel while the radio is receiving a call on a lower priority channel. This is to say that a receiver in the process of receiving a lower priority transmission continues to provide the call in the lower priority channel until it has determined whether there is a call in the higher priority channel. To switch to the priority channel, the priority channel is unmuted, and lower priority channel is muted. The same zero audio hole priority scan method can be extended to cover N:1 TDMA signal from a repeater.

In one embodiment capable of receiving an N:1 (multiple-channel) TDMA DMO transmission, a unique synchronization pattern is used to identify each channel (time slot). The TDMA timing includes a first time slot and a second time slot, while the detection module includes a first look-back channel detector and a second look-back channel detector dedicated to each time slot. The first look-back channel detector confirms and processes a payload of the first time slot, and the second look-back channel detector confirms and processes a payload of the second time slot. It is preferred that the two look-back channel detectors run continuously and synchronously to confirm each respective time slot and process the payload of each respective time slot. In the aforementioned embodiment, the look-back channel detectors may enable zero audio hole priority scan, since each channel has its own dedicated channel detector that could scan for the priority of a channel.

In one embodiment, the method for channel and/or carrier detection includes looking for the presence of a carrier using a carrier detection method and looking for a first channel and a second channel once the carrier is detected. At this point, the communications device is aware that there is sufficient RF power to constitute the channels, however the presence of the channels remains unknown. To alleviate this, the communications device scans for a primary synchronization pattern for the first and second channel. Upon detecting the primary synchronization patterns, the locations of the individual channels are known. To avoid false detection, the method continues by looking back to the beginning of the transmission (burst) to evaluate the first channel from the beginning of the burst through the synchronization pattern to the end of the burst. This enables the communications device to confirm whether there is valid carrier detection within the channel and a valid synchronization pattern. Upon confirmation of valid carrier and synchronization pattern, the location of each individual channel is confirmed, so carrier detection on a particular channel may be continued on the second channel.

Figure 5:
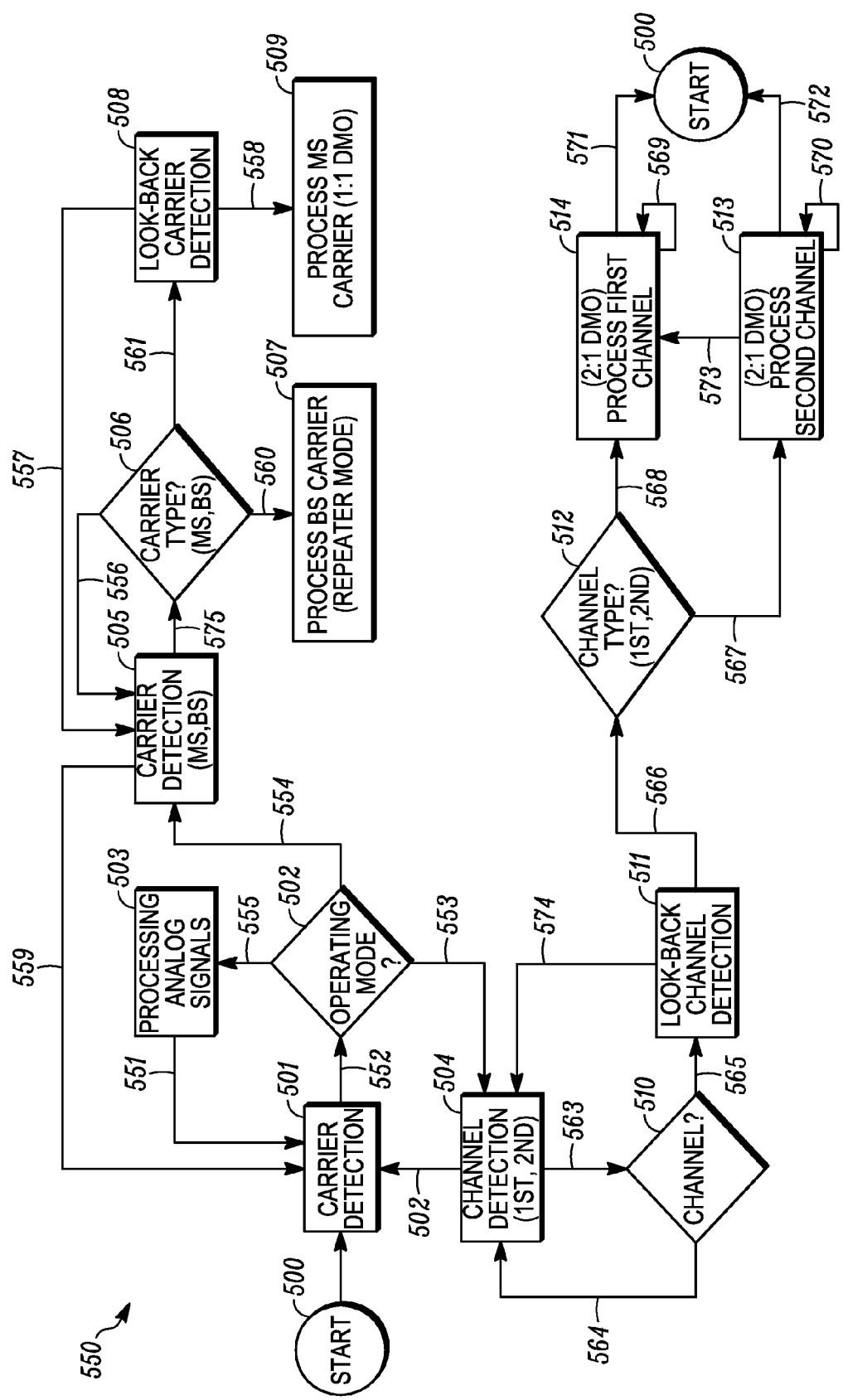
FIG. 5 depicts a flowchart illustration of a method for detecting a channel and a carrier in a mixed mode communications system, in accordance with one embodiment of the present invention.
Figure 6:
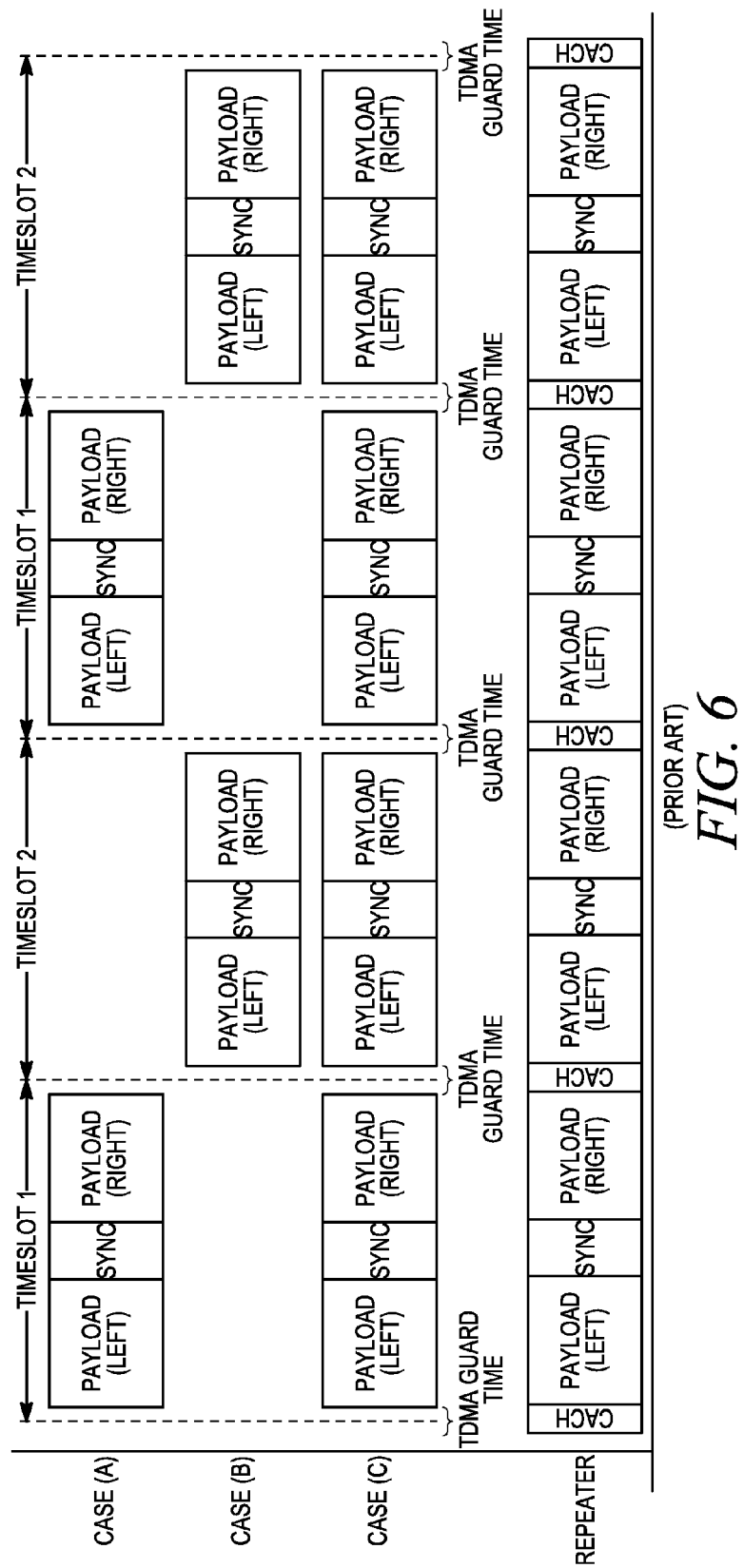
FIG. 6 depicts three cases of transmissions that a conventional carrier detection process will not be able to distinguish because of its fast-attack and slow-release design characteristics.

With reference to FIG. 5, depicted is a flow chart of one embodiment of a method 550 for detecting a channel and a carrier in a mixed mode communications system. The method 550, which makes use of a primary synchronization pattern of a channel and/or carrier, is initiated at block 500.

At block 501, a carrier is detected 552. The carriers can use different types of format depending on the mode of operation and originating device, e.g., DMO digital format, repeater mode digital format, and analog format. Detection of the carrier occurs through known methods of carrier detection. At block 502, the communications device 100 switches to an operating mode (DMO digital mode 553, repeater digital mode 554, or analog mode 555) which is appropriate for the carrier detected 552. The switch at block 502 is based on a priori knowledge of types of signals to expect on a channel. The analog mode is relatively simple, where analog mode format is detected 555 the method continues to block 503 where a signal of the analog carrier is processed. Where the analog carrier is undetected at block 503, the method returns 551 to block 501 to wait for a new carrier. The steps for the digital modes of operation are more complex and are described below systematically.

Where repeater mode digital format or a 1:1 DMO format is detected 554, the communications device 100 remains in the repeater mode or a 1:1 DMO format and the method moves to block 505 where a more specific digital carrier is detected 575. At block 506, the communications device 100 switches to a more specific repeater mode 560 and 561 according to the more specific digital carrier detected 575. The more specific repeater modes include mobile subscriber digital format (MS) mode (otherwise known as 1:1 DMO format) and base station digital format (BS) mode (otherwise known as repeater mode digital format). As with the previously described switch 502, the switch at block 560 is based on a priori knowledge of types of signals to expect on a channel. Where BS is detected 560, the method moves to block 507 where a signal of the BS carrier is processed. Where the MS mode is detected 561, the method moves to block 508 where a look-back carrier detector confirms the presence of the MS carrier 558. Upon confirmation of the MS carrier 558, the method moves to block 509 where a signal of the MS carrier is processed. In one embodiment, the MS carrier may be a 1:1 (meaning one direct mode transmission supported per one RF channel) DMO digital format. Where the look-back carrier detector is unable to confirm the presence of the MS carrier 557, the method moves to block 505.

Furthermore, at block 506, where one of the expected specific digital carriers is undetected the method returns 556 to block 505 to continue searching for one of the expected specific digital carriers. Where one of the expected specific digital carriers is not detected over a particular span of time, the method returns 559 to block 501 to reinitiate itself.

Where a two-channel DMO digital format is detected 553, the communications device 100 remains in DMO digital mode and the method moves to block 504 where two-channel DMO channel detection is initiated. At block 510, channel detection has been initiated 563 and channel detection continues 564 until the presence of a channel is detected 565. If the DMO digital format is undetected, the method returns 562 to block 501 to reinitiate itself. Where the presence of a channel is detected 565, a look-back channel detector is initiated 511. If the presence of a channel is confirmed 566, the method moves to block 512, which is detection of the present channel. However, if the presence of a channel is not confirmed 574 the method continues to check for the presence of a channel.

At block 512, a channel detector determines which channel is detected. In this example, there are two channels, so block 512 determines whether the present channel a first channel or a second channel (channels of a 2:1 DMO system). Where the first channel or second channel is detected 568 or 567, the method moves respectively to block 514 or block 513, where a signal of the first channel or the second channel is processed respectively.

During the processing of either channel 513 or 514, the communications device 100 continually searches for and confirms channel synchronization patterns to confirm the existence of the particular channel being processed 569 and 570. While processing one channel, if the synchronization pattern of the other channel is detected and confirmed, then the communications device may switch to the processing of the other channel if the other channel is considered to be higher priority or a preferred channel to receive. For example, while processing the second channel 513, if the synchronization pattern of the first channel is detected and confirmed 573, the process then moves to block 514, processing the first channel. In one embodiment, the switching from one channel to another occurs without gap in the transmission due to both channels being processed continually, individually, and synchronously. In the case of an audio transmission, switching between channels is done by muting a low priority channel and unmuting a priority channel.

While the channels are being processed, if the presence of either channel is undetected the method returns 571 and 572 to block 500 to reinitiate itself.

In one TDMA embodiment, the look back carrier detector is only activated once synchronization is detected and only processes the data belonging to the slot that contains the synchronization pattern detected. In particular, after receiving a synchronization burst, the location of the synchronization burst is used to determine the data edge for each slot. Once synchronization is detected as little as about 17.5 ms worth of data is retained in internal memory of the communications device for post-processing. After the synchronization detection is validated, a slot carrier detector is then used to only process data samples from its own slot. Thus, two independent slot carrier detectors are run simultaneously to process the data samples belonging to each slot. The use of the look back carrier detector thus resolves the problem of false synchronization detection due to false carrier detection in the incorrect slot.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes through the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented through Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more communications device programs running on one or more communications devices (e.g., as one or more programs running on one or more communications device systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a communications device readable memory medium such as a magnetic medium like a floppy disk, a hard disk drive, and magnetic tape; an optical medium like a Compact Disc (CD), a Digital Video Disk (DVD), and a Blu-ray Disc; communications device memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. Accordingly, the invention is not to be restricted except in light of the appended claims and their equivalents.

The invention claimed is:

1. A method for detecting one of a channel and a carrier in a mixed mode Time Division Multiple Access (TDMA) communications system, the channel comprising a time slot having a primary synchronization pattern located within a portion the time slot, the method comprising:

detecting one of channel and carrier existence in the mixed mode TDMA communications system by determining that a match exists between a received primary synchronization pattern associated with a particular time slot in which the primary synchronization pattern was received and one of a plurality of predetermined synchronization patterns, wherein the received primary synchronization pattern is located in a central portion of the particular time slot;

responsive to detecting one of channel and carrier existence:

determining, as a function of a temporal location of the received primary synchronization pattern, a location of a first data edge of the particular time slot occurring temporally prior to the received primary synchronization pattern and a location of a second data edge of the particular time slot occurring temporally after the received primary synchronization pattern; and confirming the one of channel and carrier existence, in order to avoid false detection of the one of channel and carrier existence, by determining, via a look-back detector, that a first signal strength of the particular time slot in which the matched synchronization pattern was detected, from the first data edge to the second data edge of the particular time slot, exceeds a first predetermined signal strength.

2. The method of claim 1, wherein the step of detecting one of channel and carrier existence further comprises detecting carrier existence in the particular time slot by determining that a carrier match between the primary synchronization pattern and one of a plurality of predetermined carrier synchronization patterns exists.

3. The method of claim 2, wherein the step of confirming the one of channel and carrier existence further comprises confirming the carrier existence once the carrier match is detected by determining that a second signal strength of the carrier, from the first data edge of the particular time slot to the second data edge of the particular time slot, exceeds a second predetermined signal strength.

4. The method of claim 1, further comprising indicating a mode of operation and a status of the channel.

5. The method of claim 1, further comprising a zero audio hole priority scan.

6. The method of claim 1, wherein the step of detecting one of channel and carrier existence further comprises detecting channel existence in the particular time slot by determining that a channel match between the primary synchronization pattern and one of a plurality of predetermined channel synchronization patterns exists.

7. The method of claim 6, wherein the step of confirming the one of channel and carrier existence further comprises confirming the channel existence once the channel match is detected by determining that a second signal strength of the particular time slot, from the first data edge of the particular time slot to the second data edge of the particular time slot, exceeds a second predetermined signal strength.

8. The method of claim 6, wherein the mixed mode TDMA communications system is a N:1 slotting ratio supporting N time slots with each of the N time slots associated with a separate channel synchronization pattern, and wherein the step of confirming the one of channel and carrier existence comprises determining, via a particular look-back channel detector dedicated to the particular time slot, that the first signal strength of the particular time slot in which the matched synchronization pattern was detected exceeds the first predetermined signal strength, wherein N is a nonzero integer.

9. The method of claim 1, wherein the first data edge is a first symbol of a payload burst transmitted within the particular time slot and the second data edge is a last symbol of the payload burst transmitted within the particular time slot.

10. A detection module for detecting one of a channel and a carrier in a mixed mode Time Division Multiple Access (TDMA) communications system, the channel comprising a time slot having a primary synchronization pattern located within a portion of the time slot, the detection module comprising:
   a synchronization pattern detector having a first correlator configured to detect one of channel and carrier existence in the mixed mode TDMA communications system by determining that a match exists between a received primary synchronization pattern associated with a particular time slot in which the primary synchronization pattern was received and one of a plurality of predetermined synchronization patterns, wherein the received primary synchronization pattern is located in a central portion of the particular time slot; and
   a look-back detector having a first energy detector configured to, responsive to the synchronization pattern detector detecting a match:
   determine, as a function of a temporal location of the received primary synchronization pattern, a location of a first data edge of the particular time slot occurring temporally prior to the received primary synchronization pattern and a location of a second data edge of the particular time slot occurring temporally after the received primary synchronization pattern; and
   confirm the one of channel and carrier existence, in order to avoid false detection of the one of channel and carrier existence, by determining that a first signal strength of the particular time slot, from the first data edge of the particular time slot to the second data edge of the particular time slot, exceeds a first predetermined signal strength.

11. The detection module of claim 10, wherein the first correlator is configured to detect carrier existence in the particular time slot by determining that a match exists between the received primary synchronization pattern and one of a plurality of predetermined carrier synchronization patterns.

12. The detection module of claim 11, wherein the look-back detector is configured to, responsive to the first correlator detecting the carrier existence, confirm the carrier existence by determining that a second signal strength of the carrier, from the first data edge of the particular time slot to the second data edge of the particular time slot, exceeds a second predetermined signal strength.

13. The detection module of claim 10, where the detection module is configured to indicate a mode of operation and a status of the channel.

14. The detection module of claim 10, where the detection module is configured to perform a zero audio hole priority scan.

15. The detection module of claim 10, wherein the first correlator is configured to detect channel existence in the particular time slot by determining that a match exists between the primary synchronization pattern and one of a plurality of predetermined channel synchronization patterns.

16. The detection module of claim 15, wherein the look-back detector is configured to, responsive to the first correlator detecting the channel existence, confirm the channel existence by determining that a second signal strength of the particular time slot, from the first data edge of the particular time slot to the second data edge of the particular time slot, exceeds a second predetermined signal strength.

17. The detection module of claim 15, wherein the mixed mode TDMA communications system is a N:1 slotting ratio supporting N time slots with each of the N time slots associated with a separate channel synchronization pattern, and wherein the look-back detector is a particular look-back channel detector dedicated to the particular time slot, wherein N is a non-zero integer.

18. The detection module of claim 10, wherein the first data edge is a first symbol of a payload burst transmitted within the particular time slot and the second data edge is a last symbol of the payload burst transmitted within the particular time slot.

* * * * *

UNITED STATES PATENT AND TRADEMARK OFFICE
CERTIFICATE OF CORRECTION

| | |
|---|---|
| PATENT NO. | : 8,730,855 B2 |
| APPLICATION NO. | : 12/976081 |
| DATED | : May 20, 2014 |
| INVENTOR(S) | : Hun Weng Khoo et al. |

It is certified that error appears in the above-identified patent and that said Letters Patent is hereby corrected as shown below:

ON THE TITLE PAGE:

In Item (75), under "Inventors", in Column 1, Line 2, delete "Pul" and insert -- Georgetown, Pul --, therefor.

In Item (56), under "OTHER PUBLICATIONS", in Column 2, Line 4, delete "Bsiness Press" and insert -- Business Press --, therefor.

IN THE SPECIFICATION:

In Column 8, Line 5, delete "mode switch 356" and insert -- mode switch 360 --, therefor.

IN THE CLAIMS:

In Column 14, Lines 12-13, in Claim 1, delete "portion the" and insert -- portion of the --, therefor.

In Column 14, Line 43, in Claim 2, delete "the primary" and insert -- the received primary --, therefor.

In Column 16, Line 17, in Claim 13, delete "where the" and insert -- wherein the --, therefor.

In Column 16, Line 20, in Claim 14, delete "where the" and insert -- wherein the --, therefor.

Signed and Sealed this
Tenth Day of May, 2016

Michelle K. Lee
*Director of the United States Patent and Trademark Office*